(12) United States Patent
Kikitsu et al.

(10) Patent No.: US 9,269,387 B2
(45) Date of Patent: Feb. 23, 2016

(54) MAGNETIC RECORDING MEDIUM AND METHOD OF FABRICATING THE SAME

(71) Applicant: KABUSHIKI KAISHA TOSHIBA, Tokyo (JP)

(72) Inventors: Akira Kikitsu, Yokohama (JP); Naoko Kihara, Kawasaki (JP); Yoshiyuki Kamata, Tokyo (JP); Hiroyuki Hieda, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/576,001

(22) Filed: Dec. 18, 2014

(65) Prior Publication Data
US 2015/0102008 A1   Apr. 16, 2015

Related U.S. Application Data

(62) Division of application No. 13/912,519, filed on Jun. 7, 2013, now Pat. No. 8,958,177.

(30) Foreign Application Priority Data

Jul. 27, 2012   (JP) .................................. 2012-166905

(51) Int. Cl.
*G11B 5/82*   (2006.01)
*G11B 5/84*   (2006.01)
(Continued)

(52) U.S. Cl.
CPC   *G11B 5/84* (2013.01); *G11B 5/743* (2013.01); *G11B 5/746* (2013.01); *G11B 5/82* (2013.01); *G11B 5/855* (2013.01)

(58) Field of Classification Search
CPC .......... G11B 5/746; G11B 5/743; G11B 5/82; G11B 5/84; G11B 5/012; G11B 5/855
USPC ................. 360/135; 216/11, 22, 41
See application file for complete search history.

(56) References Cited

U.S. PATENT DOCUMENTS

| 8,059,350 | B2 | 11/2011 | Albrecht et al. |
| 8,300,340 | B2 * | 10/2012 | Sakurai et al. .................. 360/48 |
| 8,593,750 | B2 | 11/2013 | Shibano |

(Continued)

FOREIGN PATENT DOCUMENTS

| JP | 2004-303302 | 10/2004 |
| JP | 2008-243322 | 10/2008 |

(Continued)

OTHER PUBLICATIONS

Office Action mailed Oct. 21, 2014 in counterpart Japanese Application No. 2012-166905 and English-language translation of same.

*Primary Examiner* — Will J Klimowicz
(74) *Attorney, Agent, or Firm* — Nixon & Vanderhye, P.C.

(57) ABSTRACT

In one embodiment, there are provided: a substrate; a data area disposed on the substrate and having a plurality of first magnetic dots arrayed in lines in mutually different first, second, and third directions; and a boundary magnetic part having a plurality of first magnetic portions arrayed in a line in the third direction and each having a length longer than that of the first magnetic dot in the third direction, and a second magnetic dot disposed between the first magnetic portions and disposed on extensions in the first and second directions of the first magnetic dots, and disposed along with the data area on the substrate.

10 Claims, 8 Drawing Sheets

(51) Int. Cl.
*G11B 5/855* (2006.01)
*G11B 5/74* (2006.01)

(56) References Cited

U.S. PATENT DOCUMENTS

| | | | |
|---|---|---|---|
| 8,945,364 B2 * | 2/2015 | Uchida | 205/206 |
| 8,958,177 B2 | 2/2015 | Kikitsu et al. | |
| 8,995,073 B1 * | 3/2015 | Pokharel et al. | 360/48 |
| 2008/0239896 A1 | 10/2008 | Kuroda | |
| 2011/0222189 A1 | 9/2011 | Uchida | |
| 2011/0267718 A1 | 11/2011 | Itakura et al. | |
| 2012/0063028 A1 * | 3/2012 | Sakurai et al. | 360/78.01 |
| 2015/0102008 A1 * | 4/2015 | Kikitsu et al. | 216/22 |

FOREIGN PATENT DOCUMENTS

| | | |
|---|---|---|
| JP | 2011-108323 | 6/2011 |
| JP | 2011-210330 | 10/2011 |
| JP | 2011233210 A * | 11/2011 |
| JP | 2012160233 A * | 8/2012 |
| JP | 2013196747 A * | 9/2013 |

* cited by examiner

MAGNETIC RECORDING MEDIUM AND METHOD OF FABRICATING THE SAME

CROSS REFERENCE TO RELATED APPLICATIONS

This application is a divisional of application Ser. No. 13/912,519, filed Jun. 7, 2013, now U.S. Pat. No. 8,958,177, which is based upon and claims the benefit of priority from the prior Japanese Patent Application No. 2012-166905, filed on Jul. 27, 2012; the entire contents of each of which are incorporated herein by reference.

FIELD

Embodiments described herein relate generally to a magnetic recording medium and a method of fabricating the same.

BACKGROUND

A magnetic recording medium used in a hard disk drive (HDD) is a recording medium for recording and reproducing information magnetically, and an improvement in its recording density is in progress. As a technique to improve the recording density of the magnetic recording medium, a patterned medium (bit patterned medium: BPM, for example) has been studied. The patterned medium is obtained by processing a continuous magnetic film to form a pattern (dot, for example). The patterned medium is being actively studied because it can reduce the thermal instability in a current magnetic recording medium made of a granular thin film.

A data area of the magnetic recording medium is usually divided into a plurality of zones in a radial direction for the purpose of efficient data handling. A marker is usually disposed at the boundary of these zones. By using a magnetic material as the marker, a signal from the marker is obtained when a magnetic head crosses the zones. This signal can be utilized as a trigger to know the change in the zones.

However, the information obtained from the marker when the magnetic head crosses the marker is not always sufficient.

DETAILED DESCRIPTION

In one embodiment, there are provided: a substrate; a data area disposed on the substrate and having a plurality of first magnetic dots arrayed in different first, second, and third directions; and a boundary magnetic part having a plurality of first magnetic portions, that are arrayed in a line in the third direction and are longer than the first magnetic dot in the third direction, and a second magnetic dot disposed between the first magnetic portions and disposed on the extension lines in the first and the second directions of the first magnetic dots, and disposed along with the data area on the substrate.

Figure 1:
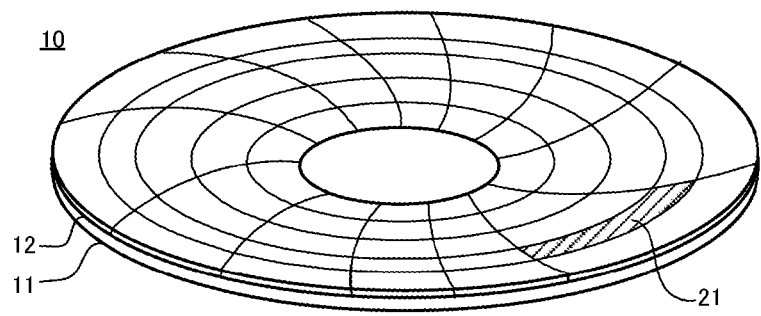
FIG. 1 is a schematic diagram illustrating a magnetic recording medium according to an embodiment.

Hereinafter, embodiments will be described in detail while referring to the drawings. FIG. 1 is a schematic diagram illustrating a magnetic recording medium 10 (patterned medium) according to an embodiment. The magnetic recording medium 10 can be utilized for a hard disk (HD), for example, and has a substrate 11 and a magnetic recording layer 12.

The substrate 11 has approximately a disk shape with an opening (through hole). A nonmagnetic material (glass, metal, semiconductor, ceramics, plastic, and the like) can be used as a material of the substrate.

The magnetic recording layer 12 is a layer in which data is magnetically recorded. By using a later-described magnetic head, data can be recorded (written) in and reproduced (read) from the magnetic recording layer 12.

The magnetic recording layer 12 is divided into a plurality of sectors 21 in circumferential and radial directions of the substrate 11. Data is recorded and reproduced along the circumferential direction (later-described data track T) of the magnetic recording medium 10.

The magnetic recording medium 10 may have under layers, protective layers, and lubricant layers. The under layer is disposed between the substrate 11 and the magnetic recording layer 12 to control a crystal orientation of the magnetic recording layer 12 and to improve an adhesion between the substrate and the magnetic recording layer. The protective layer is disposed on the magnetic recording layer 12 to protect the magnetic recording layer 12. The lubricant layer is disposed on the protective layer. The lubricant layer consists of, for example, perfluoropolyether (PFPE).

Figure 2:
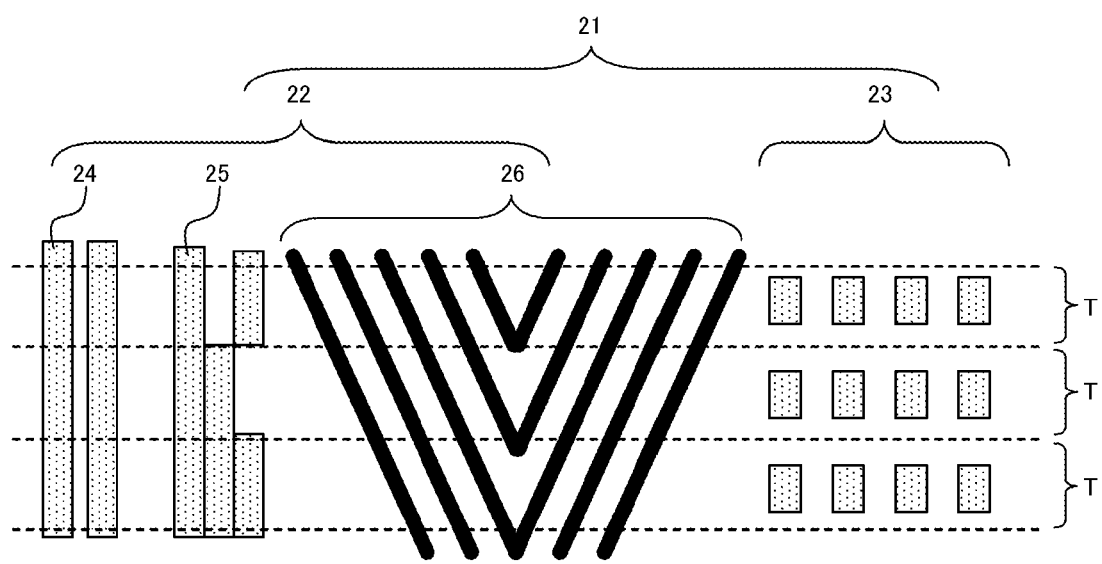
FIG. 2 is a schematic diagram illustrating an outline of an array of data on the magnetic recording medium.
Figure 3:
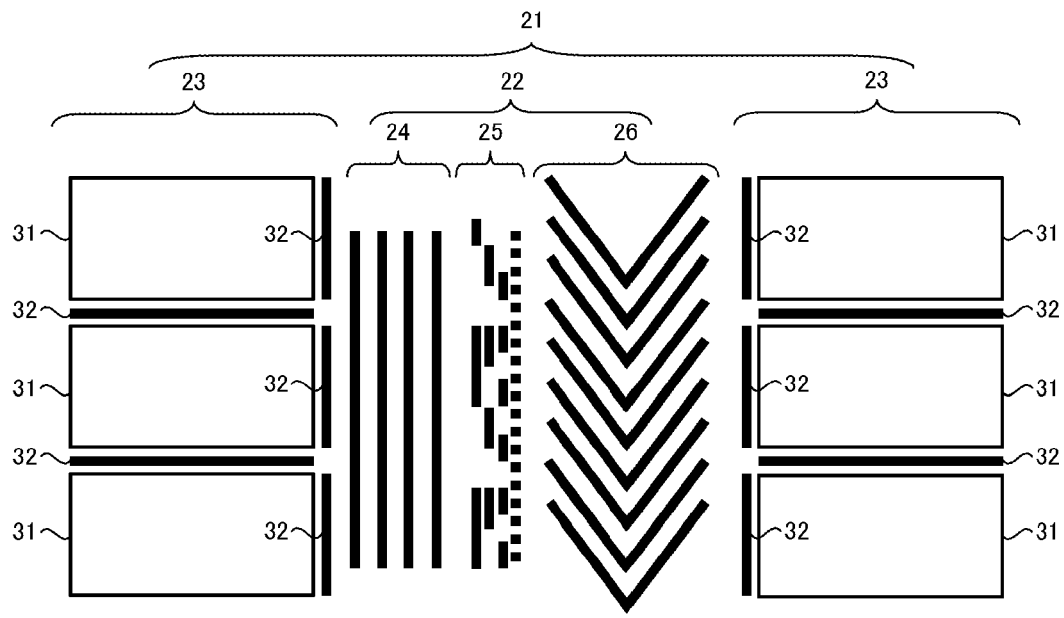
FIG. 3 is a schematic diagram illustrating details of the array of data on the magnetic recording medium.

FIG. 2 and FIG. 3 are schematic diagrams illustrating an outline and details, respectively, of the arrangement of data on the magnetic recording medium 10.

The sector 21 can be divided into a servo area 22 and a data area 23. In the servo area 22, a servo signal for controlling the position of a magnetic head 51 is recorded. The data area 23 has a plurality of magnetic dots (later-described magnetic dots 41) corresponding to a predetermined number of bits (1 bit, for example), and data is recorded in and reproduced from the area.

The servo area 22 can be divided into a plurality of servo signal areas having different functions (in this case, a preamble 24, an address part 25, and a servo signal part 26). In the preamble 24, a synchronization signal is recorded for such as a signal reproduction. In the address part 25, an address signal indicating a location of data is recorded. In the servo signal part 26, a servo signal for positioning (controlling) the magnetic head 51 on an appropriate position (targeted data track T) of a data row (line of magnetic material dots 41), is recorded. The phase difference type servo signal system can be used as the servo signal.

The data track (track) T is an area along a circumferential direction in which a data row is stored. Although a boundary of the data track T is not apparent on the magnetic recording medium 10, the boundary of the data track T is indicated by a dotted line in FIG. 2 for the help of understanding.

As illustrated in FIG. 3, the data area 23 can be divided into data parts 31 and boundary magnetic parts 32. In the data part 31, the later-described magnetic dots 41 are disposed, and data is recorded. The boundary magnetic parts 32 divide the data area 23 in the radial direction and the circumferential direction. The divided data area 23 corresponds to the data part 31.

Figure 4:
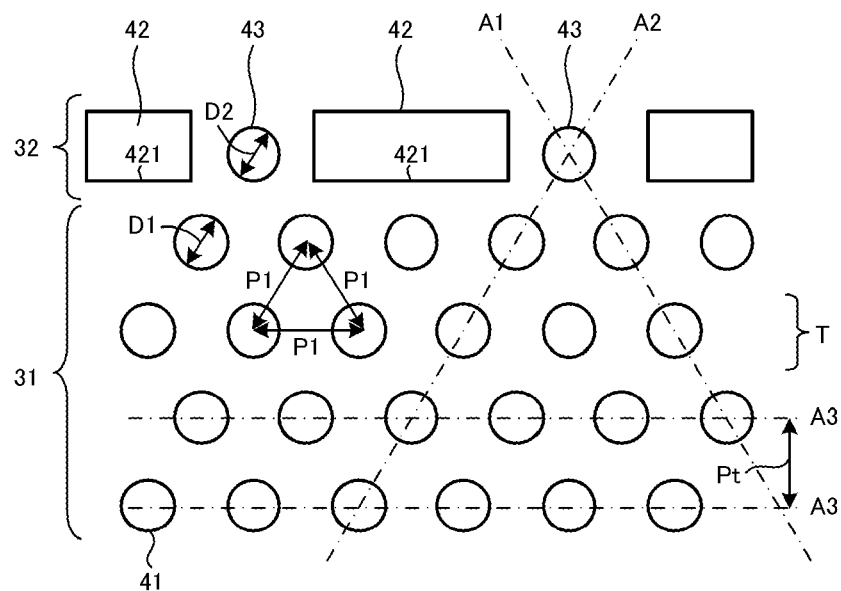
FIG. 4 is a schematic diagram illustrating one example of a servo area and a data area of the magnetic recording medium.

A further detailed schematic diagram of a periphery of the data part 31 and the boundary magnetic part 32 is illustrated in FIG. 4. In the data part 31, the magnetic dots 41 having approximately a circular shape (cylinder shape) are arrayed at a pitch (interval) P1 in the different lines with directions A1 to A3. This arrangement is hexagonal close-packed array. That is, three adjacent magnetic dots 41 form approximately an equilateral triangle. As will be described later, the triangle arrangement may have a certain degree of deviation (distortion).

The arrangement of the magnetic dots 41 can be freely selected. However, in order to have maximum density of the magnetic recording medium 10, it is preferable that the circular magnetic dots 41 are disposed in a hexagonal close-packed form.

Each magnetic dots 41 is a so-called single magnetic domain particle, which is physically isolated and exhibits an independent magnetization reversal. Here, the direction A3 is set as a circumferential direction (track direction) of the magnetic recording medium 10. Each line of the magnetic dots 41 in the circumferential direction A3 is the data track T. From a macroscopic viewpoint, the circumferential direction of the magnetic recording medium 10 forms a circular curve, but, from a microscopic viewpoint (several μm to several tens of nm) where the magnetic dots 41 are recognizable, the circumferential direction can be practically assumed to be a straight line.

Since the magnetic recording medium 10 has a disk shape, the length of the circumference of a circle near inner side of the substrate and that near outer side of the substrate are different. For this reason, it is possible to design that a linear recording density per one round is increased with radius of the magnetic recording medium 10. It is also possible to design that the linear density is constant throughout the radial direction of the magnetic recording medium 10.

In the latter case, the pitch (interval) P1 of the magnetic dots 41 is set to constant on the whole surface of the magnetic recording medium 10. Specifically, on the whole surface of the magnetic recording medium 10, the magnetic dots 41 are arrayed in the hexagonal close-packed form at the same pitch (interval) P1.

By designing as above, the magnetic recording medium 10 has a high recording density, and further, a disturbance and a distribution of coercive force (magnetic field required for the magnetization reversal) become small. However, since a recording frequency changes with a radius, a recording/reproducing system becomes complicated.

In the former case, it is set that the pitch P1 of the magnetic dots 41 (and a size (diameter D1) of the magnetic dot 41 as well, in an ordinary case) is (are) designed to increase toward the outer periphery of the magnetic recording medium 10. In this case, the recording frequency is constant throughout the radial direction, resulting in that the recording/reproducing system can be simplified. However, the magnetic recording medium 10 has relatively lower recording density than that in the latter case. Further, since the pitch P1 (diameter D1) of the magnetic material dots 41 is not constant, the coercive force may vary. Since the magneto-static interaction between the magnetic dots 41 is not constant, the coercive force and/or thermal stability of the magnetic dots 41 may also vary.

Note that it is also possible to design that the pitch P1 of the magnetic dots 41 is increased toward the outer periphery of the magnetic recording medium 10 within a sector 21 to keep the recording frequency is constant. By designing as above, it is required to change the recording frequency only when the recording head changes its target sector 21 along radial direction. In this case, the degree of freedom for designing the recording/reproducing system is increased.

As described above, each of the case where the pitch (interval) P1 of the magnetic dots 41 is set to constant and the case where the pitch is set to be variable (the pitch is increased toward the outer peripheral direction (upper direction in FIG. 4)) has good and bad points. The case may be appropriately selected or combined according to the design of the HDD system.

The magnetic dots 41 illustrated in FIG. 4 are only required to be disposed approximately in a hexagonal close-packed form. Specifically, as long as the data track T can be configured in the circumferential direction (direction A3) of the magnetic recording medium 10, the hexagonal close-packed form may be deviated to some degree. Generally, it is only required that the magnetic dots 41 are disposed approximately in parallel to the data tracks Ts within a deviation of about 1/10 of a track pitch Pt. That is, the pitch P1 is to have a variation of about 1/10 of the track pitch Pt (the accuracy of the pitch P1 is about ±10%).

As long as the magnetic head 51 can stay on a targeted track, the pitch P1 in the radial direction (directions A1 and A2) may deviate in some degree. In order to obtain the magnetic recording medium 10 with high density, it is preferable that the deviation in the pitch (interval) P1 of the magnetic dots 41 is within about 1/10 of the track pitch Pt (the accuracy of the pitch P1 is about ±10%), for example.

The boundary magnetic part 32 has magnetic portions 42 and magnetic dots 43.

The magnetic portion 42 is made of a magnetic material, and forms a marker that divides the sector 21 (zone). When the magnetic head crosses the boundary of the sectors 21, a signal from the magnetic portion 42 is obtained, then the system knows the timing to switch the sectors 21 (zones).

The magnetic portion 42 (marker) has a shape which is long in the circumferential direction (direction A3). Specifically, the portion has a long side edge (edge 421) along the direction A3. When the magnetic portion 42 (marker) is long to some extent, a reversal magnetic domains are formed. The formation of the magnetic domains becomes a noise source and thus is unfavorable. For this reason, the magnetic portion 42 (marker) may be divided short enough to prevent the generation of reversal magnetic domains, in the circumferential direction (direction A3) of the magnetic portion 42.

The magnetic dot 43 is made of a magnetic material, and has functions to assist the function of the magnetic portion 42 as the marker.

As described above, when the magnetic head crosses the boundary of the sectors 21, a signal indicating the boundary is generated from the magnetic portion 42. However, at this time, a signal of the data part (signal from the magnetic material dot 41 in the data part 31) is not reproduced, and information of the recorded data is interrupted. In particular, when the magnetic head moves along the boundary of the sectors 21 (the magnetic material portion 42, the direction A3), a period of time during which the data information is interrupted becomes long.

Accordingly, in the present embodiment, by disposing the magnetic dot 43 between the magnetic material portions 42, the information from the boundary magnetic part 32 is increased. Specifically, the system may process the data which is already reproduced, or preliminary obtain a timing signal for data to be read next.

The magnetic dot 43 has approximately the same shape (cylinder shape) and the size as those of the magnetic dot 41 of the data part 31, and has the same phase condition of the arrangement as that of the magnetic dot 41 of the data part 31.

It is only required that the signal can be obtained from the boundary magnetic part 32, so that a diameter D2 of the magnetic dot 43 is only required to be within a range of ±10% of the diameter D1 of the magnetic dot 41. When the diameter D2 of the magnetic dot 43 becomes larger than the diameter D1 of the magnetic dot 41 by 50%, D2 becomes almost equal to D1 plus the interval (pitch P1) between the magnetic dot 41. In this case, information of the data becomes difficult to be obtained, and is unfavorable.

To satisfy the same phase condition of the arrangement means that the magnetic dot 43 in the boundary magnetic part 32 is placed at the position at which directions of hexagonal close-packed array (directions A1 and A2) intersect, as illustrated in FIG. 4. As described above, since the magnetic dots 41 may form hexagonal close-packed structure with deviation of certain extent, an accuracy of the phase condition of the arrangement may have the same accuracy to that of the hexagonal close-packed structure. Specifically, an error of about $\frac{1}{10}$ of the track pitch Pt (about ±10% of the pitch P1) is acceptable with respect to the position at which the directions A1 and A2 intersect.

The magnetic portion 42 has the long side edge (side edge 421) along any one of the array directions A1 to A3 of the magnetic dots 41 (direction A3 in the case of FIG. 4). This side edge 421 is along the boundary of the sectors 21 (zones).

If the magnetic portion 42 has approximately the same shape and the size as those of the magnetic dot 41 of the data part 31, it is difficult to distinguish the magnetic portion 42 and the magnetic dot 41 of the data part 31, which is unfavorable. Further, when this pattern is drawn by an electron beam drawing process or the like, it is required to draw a high-density pattern, so that a fabrication cost is increased, which is unfavorable.

It is only required that a size of the magnetic portion 42 (length in the direction A3 or the like) is about the size in which a magnetic domain is not formed. The size in which the magnetic domain is not formed depends on magnetic properties, film thickness of the magnetic material to be used, and a magnetization state around it. The size of the magnetic portion 42 is determined according to the design of the system, and is not particularly specified in the present embodiment. Generally, the size of the magnetic portion 42 (length L in the direction A3) is larger than the diameter D1 of the magnetic dot 41 of the data part 31 (about 1.5 to 10 times the diameter D1, for example).

Figure 5:
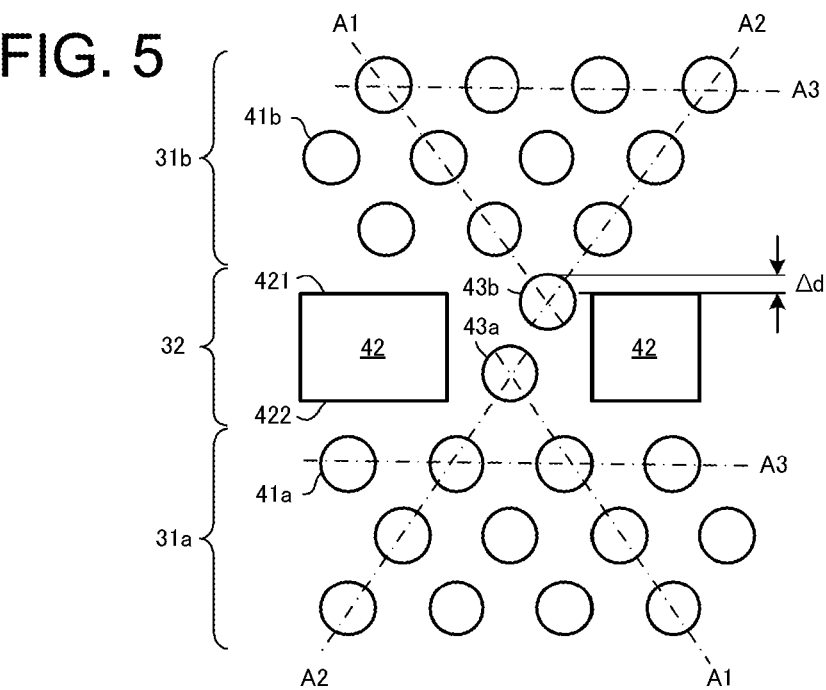
FIG. 5 is a schematic diagram illustrating one example of a servo area and a data area of the magnetic recording medium.

The data part 31 and the boundary magnetic part 32 may employ a configuration other than that of FIG. 4. An example thereof is illustrated in FIG. 5. In this case, the boundary magnetic part 32 is disposed on a boundary between data parts 31a and 31b. Side edges 421 and 422 of the boundary magnetic part 32 are along the direction A3, and face the data parts 31a and 31b. Here, magnetic dots 43a and 43b of the boundary magnetic part 32 preferably satisfy phase conditions of the arrangement of magnetic dots 41a and 41b in the adjacent data parts 31a and 31b, respectively. Specifically, a position at which the directions A1 and A2 in which the magnetic dots 41a are arrayed intersect corresponds to the position of the magnetic dot 43a, and a position at which the directions A1 and A2 in which the magnetic dots 41b are arrayed intersect corresponds to the position of the magnetic dot 43b. At this time, a pitch P2 of the magnetic material dots 43 is approximately an integral multiple of the pitch P1 of the magnetic material dots 41 of the adjacent data part 31.

When the magnetic head passes over the boundary magnetic part 32 from a lower part to an upper part in FIG. 5, phase information of the lower data part 31a and phase information of the upper data part 31b can be sequentially obtained. The phase information can be used for signal processing of the data from area 31a, and for preparing for reading the data part 31b. As a result of this, it is possible to configure a magnetic recording/reproducing system (HDD, for example) with higher speed.

However, in this case, a width of the boundary magnetic part 32 is increased and the widths of the data parts 31a and 31b are reduced. Accordingly, a recording capacity of the magnetic recording medium 10 is reduced by about 1 track.

When the pitches P1 of the magnetic dots 41a and 41b are the same, the magnetic dots 43a and 43b can be placed along the direction A1 or A2 (disposed on a line of the direction A1 or A2). In this case, all the magnetic dots 41a, 41b, 43a, and 43b satisfy the phase condition of the arrangement. As a result of this, both signals from the magnetic dots 43a and 43b reflect of phase information of the data parts 31a and 31b.

On the other hand, when the pitches P1 of the magnetic dots 41a and 41b are different, positions of the magnetic dots 43a and 43b are not disposed on the same line. In this case, the signals from the magnetic dots 43a and 43b respectively reflect the phase information of the data parts 31a and 31b.

In FIG. 5, a part of an upper portion of the magnetic dot 43b of the boundary magnetic part 32 adjacent to the data part 31b enters the data part 31b by a distance Δd. Such a configuration is also allowed as long as the recording/reproduction of the first data track T of the data part 31b is performed appropriately.

Figure 6:
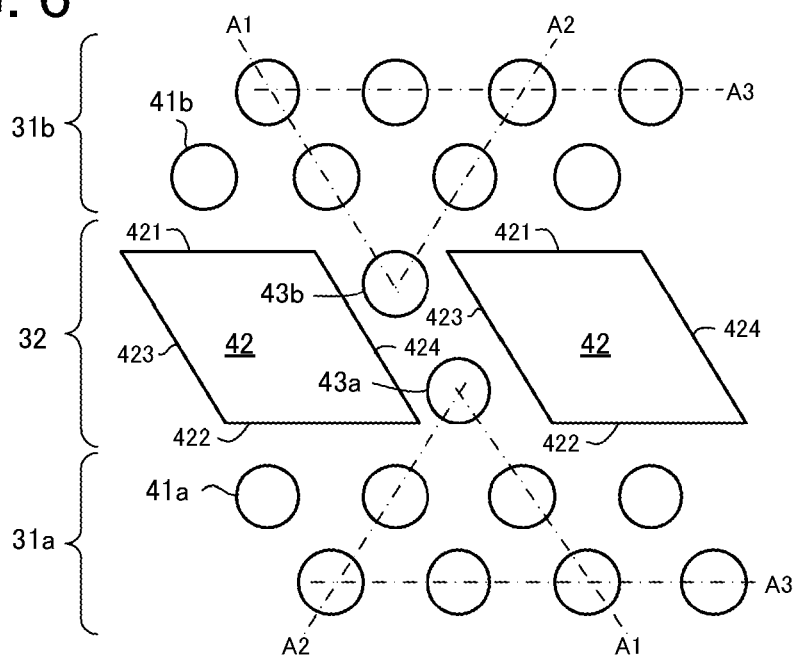
FIG. 6 is a schematic diagram illustrating one example of a servo area and a data area of the magnetic recording medium.

FIG. 6 illustrates another configuration. Side edges 423 and 424 between the magnetic portions 42 that form the boundary magnetic part 32 are oblique with respect to the radial direction (direction A3). A plurality of magnetic dots 43a and 43b are disposed between the magnetic portions 42 (between the side edges 423 and 424). Also in this case, it is possible to obtain the effect of the present embodiment (the amount of information obtained when the magnetic head crosses the marker is increased).

When such a pattern can be easily formed, it is preferable to form the magnetic portion 42 with such a shape. However, in order to draw an acute angle portion of the magnetic portion 42, the drawing with high resolution is required, which may increase the fabrication cost.

Figure 7:
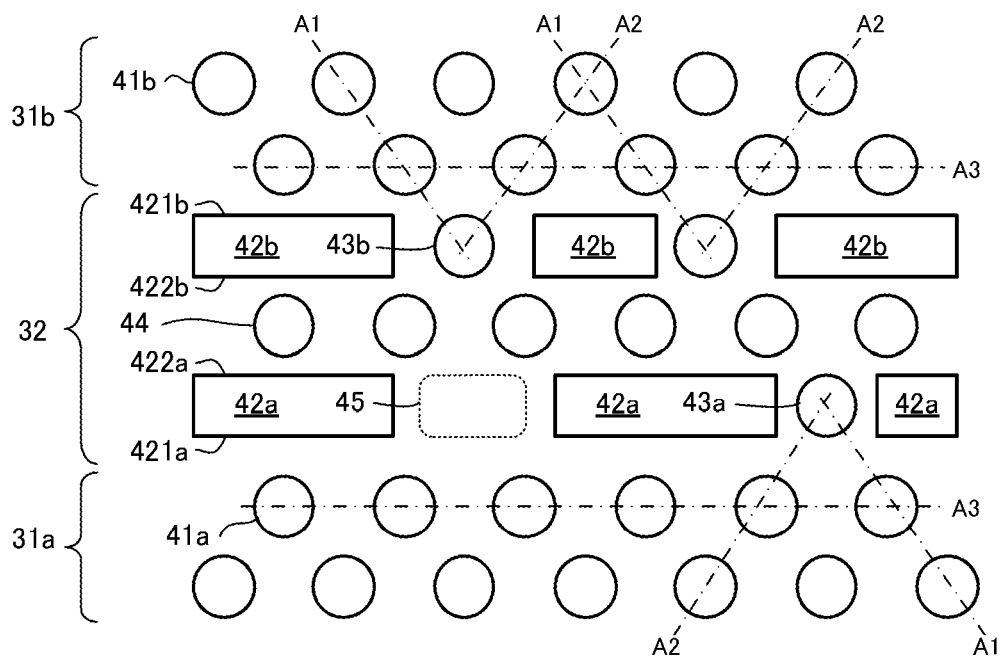
FIG. 7 is a schematic diagram illustrating one example of a servo area and a data area of the magnetic recording medium.

FIG. 7 illustrates another configuration. In this case, the boundary magnetic part 32 has magnetic portions 42a and 42b, and magnetic dots 43a, 43b, and 44. Two sets of the magnetic portions 42a and 42b, and the magnetic dots 43a and 43b are disposed along the radial direction (direction A3). Between these, the magnetic dots 44 are disposed along the radial direction (direction A3). A diameter D3 of the magnetic dot 44 is about the same as the diameter D1 of the magnetic dot 41 (within a range of ±10% of the diameter D1 of the magnetic dot 41, for example).

When the magnetic head 51 passes over the line of magnetic dots 44, a specific signal can be obtained with a large SN ratio. System may record/reproduce specific information to/from here for detailed signal processing or feedback control.

This feature is effective for the case where a particular signal generation is required at the time of crossing the sectors 21 (zones). However, the boundary magnetic part 32 becomes relatively large, and the recording capacity of the magnetic recording medium 10 is reduced. Note that in this configuration, the effect of the present embodiment (the amount of information obtained when the magnetic head crosses the marker is increased) can be achieved even if the magnetic dots 44 are not provided.

Note that in the example illustrated in FIG. 7, the magnetic dot 43a is not disposed on an area 45 in the boundary magnetic part 32. Also in the configuration as above, the effect of the present embodiment (the amount of information obtained when the magnetic head crosses the marker is increased) can be achieved.

Figure 8:
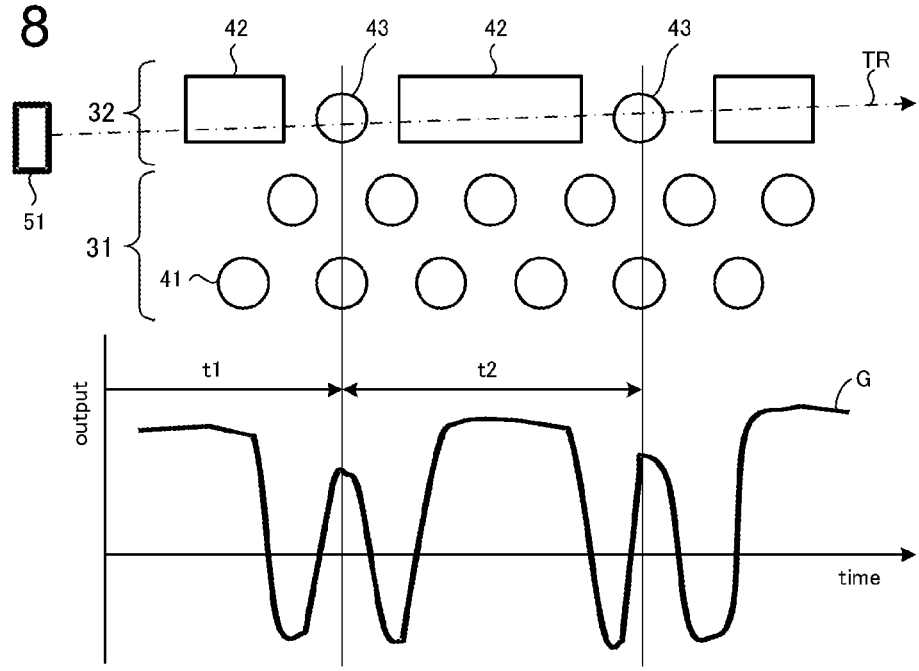
FIG. 8 is a diagram illustrating one example of a correspondence between a servo area and a reproduction signal.

Explanation will be made on a signal when the magnetic head 51 passes over the boundary magnetic part 32. FIG. 8 illustrates a basic example configured by the magnetic dots 43 and the magnetic portions 42. This is a case when the magnetic head 51 passes over the boundary magnetic part 32 after reproducing the data part 31.

The magnetic head 51 passes over the boundary magnetic part 32 along a trajectory TR. During a seek operation targeting a desired data track T or in a reproduction process or the like, a trajectory of the magnetic head 51 is different from the trajectory TR. The trajectory of the magnetic head 51 is influenced by a fluttering, an eccentricity of the magnetic recording medium 10, and a Track Mis-Registration of the magnetic head 51. However, in a range as illustrated in FIG. 8, the magnetic head 51 is assumed to pass over the boundary magnetic part 32 approximately straight, as schematically illustrated in FIG. 8.

A lower part of FIG. 8 illustrates a temporal change of a reproduction signal G obtained when the magnetic head 51 moves along the trajectory TR. By the passage of the magnetic head 51, a reproduction signal corresponding to the magnetic dot 43 is obtained. A period t2 in the reproduction signal is an integer multiple of a period of the data part 31 (a period of magnetic dot 41), and the reproduction signal includes information regarding the period of the data part 31. Further, information regarding a phase of the data part 31 (magnetic dot 41) can also be obtained from the time t1, which corresponding to a phase of the magnetic dot 43.

The time t1 is phase information of a pattern repeated by the period t2. A signal corresponding to the magnetic dot 43 can be extracted with a band-pass filter or the like, then it can be subjected to FFT (fast Fourier transform) to obtain period information (period t2) and phase information (time t1), for example. The phase information is information related to a recording/reproduction clock of the data part 31. Accordingly, by adjusting and correcting clock information of the read data from the data part 31 by using this information, it is possible to improve an error rate and to reduce a processing time.

The reproduced signal from the boundary magnetic part 32 has a characteristic waveform which is different from a waveform from the data part 31, as illustrated in FIG. 8. Therefore, the signal from the boundary magnetic part 32 can be used as a signal indicating the passage of the sectors 21 (zones) by being subjected to a pattern recognition processing or like.

The signal from the boundary magnetic part 32 includes a long-period component which does not exist in the signal from the data part 31. For this reason, by extracting this long-period component using a low-pass filter, it is possible to obtain a signal indicating the passage of the sectors 21.

Figure 9:
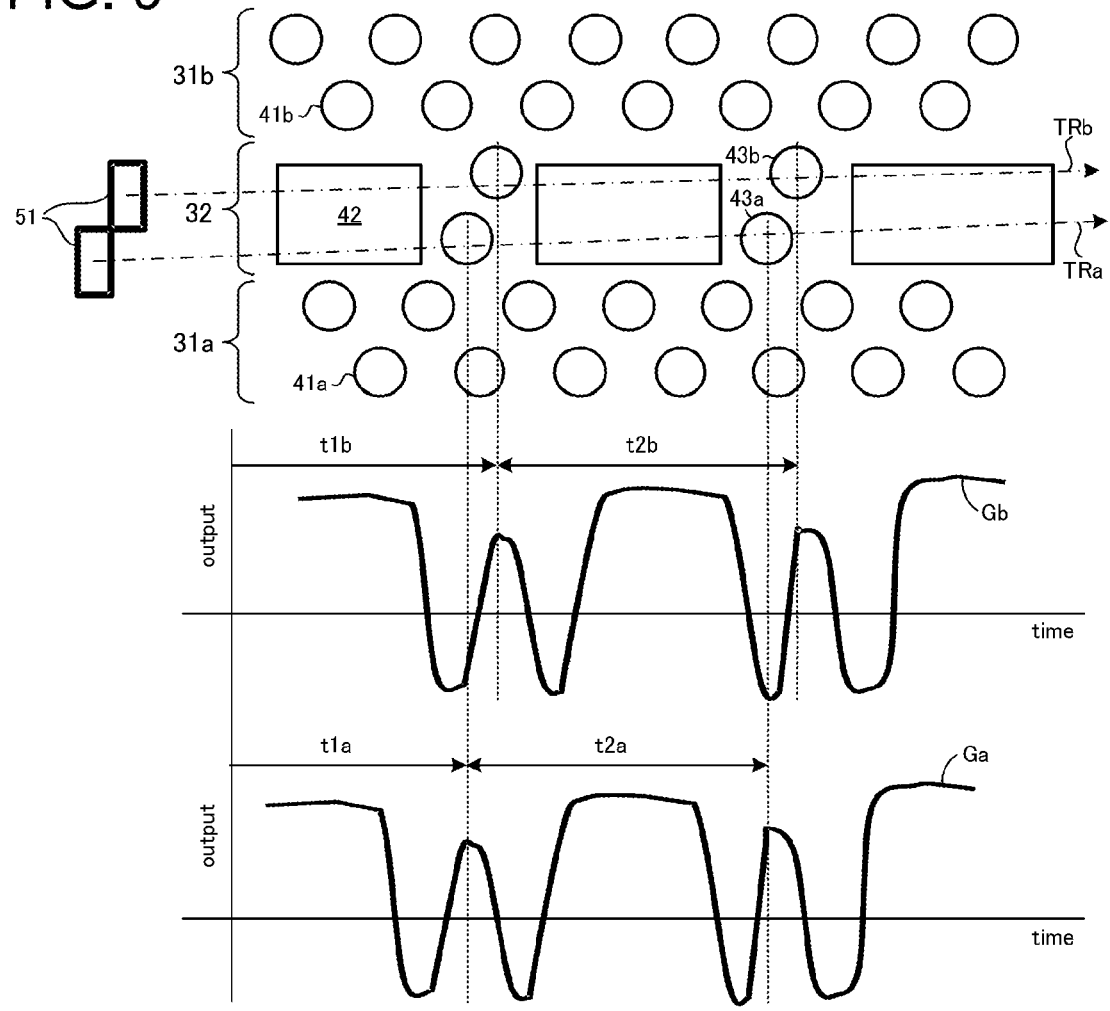
FIG. 9 is a diagram illustrating one example of a correspondence between a servo area and reproduction signals.

FIG. 9 illustrates a schematic diagram when the magnetic head 51 crosses the sectors 21 (zones) in a case where the boundary magnetic part 32 is disposed between the data parts 31a and 31b. The magnetic dots 43a and 43b in the boundary magnetic part 32 have the same phase conditions of the arrangement as those of the adjacent data parts 31a and 31b, respectively. Specifically, the magnetic dot 43a is placed at a position where the directions A1 and A2 in which the magnetic dots 41a are arrayed intersect, and the magnetic dot 43b is placed at a position where the directions A1 and A2 in which the magnetic dots 41b are arrayed intersect.

Hereafter, the case when the magnetic head 51 passes over this boundary magnetic part 32 is explained. The magnetic head 51 moves along trajectories TRa near the data part 31a and TRb near the data part 31b.

When the width of the boundary magnetic part 32 is large, or when a speed at which the magnetic head 51 strides over the sectors 21 (zones) is slow, the magnetic head may cross the same boundary magnetic part 32 twice, as illustrated in FIG. 9. However, the present embodiment is not limited to this situation. For example, the magnetic head may pass through trajectory TRa in some boundary magnetic part 32 and trajectory TRb in other boundary magnetic part 32 in the adjacent sector 21. In other case, the trajectory may change from trajectory TRa to trajectory TRb in one passage through a boundary magnetic part 32. The following explanation is applicable to any of the above cases.

A reproduced signal Ga is obtained when the magnetic head 51 passes over the boundary magnetic part 32 adjacent to the data part 31a along the trajectory TRa. Similar to the example illustrated in FIG. 8, information regarding a period and a phase of the data part 31a (magnetic dot 43a) can be obtained from the time t1a and the period t2a. This information can be utilized for signal processing of the reproduced signal from the data part 31a, and it is possible to reduce the error rate.

A reproduced signal Gb is obtained when the magnetic head 51 passes over the boundary magnetic part 32 adjacent to the data part 31b along the trajectory TRb. Similar to the example illustrated in FIG. 8, information regarding a period and a phase of the data part 31b (magnetic dot 43b) can be obtained from the time t1b and the period t2b. As described above, this information can be utilized for preparing a clock information for recording/reproducing operation in the data part 31b, and an operation speed can be improved.

As schematically illustrated in a lower part of FIG. 9, in some case, the information related to the phase of adjacent data parts 31a and 31b (times t1a and t1b) may differ. Also, the information related to the period of adjacent data parts 31a and 31b (intervals t2a and t2b) may differ. This is because pitches and phases of the magnetic dots 41a and 41b are different in the both data parts 31a and 31b.

As described above, when the recording and reproduction are conducted over the plurality of data parts 31a and 31b, information of difference in the respective data parts 31a and 31b can be obtained for the case of FIG. 9. Accordingly, the recording/reproducing system at high speed with high accuracy is possible.

Note that these effects can be achieved also in the examples illustrated in FIG. 6 and FIG. 7. Further, it is also apparent that embodiment is not limited to the examples illustrated in FIG. 5 to FIG. 9.

(Method of Fabricating Magnetic Recording Medium)

Figure 10:
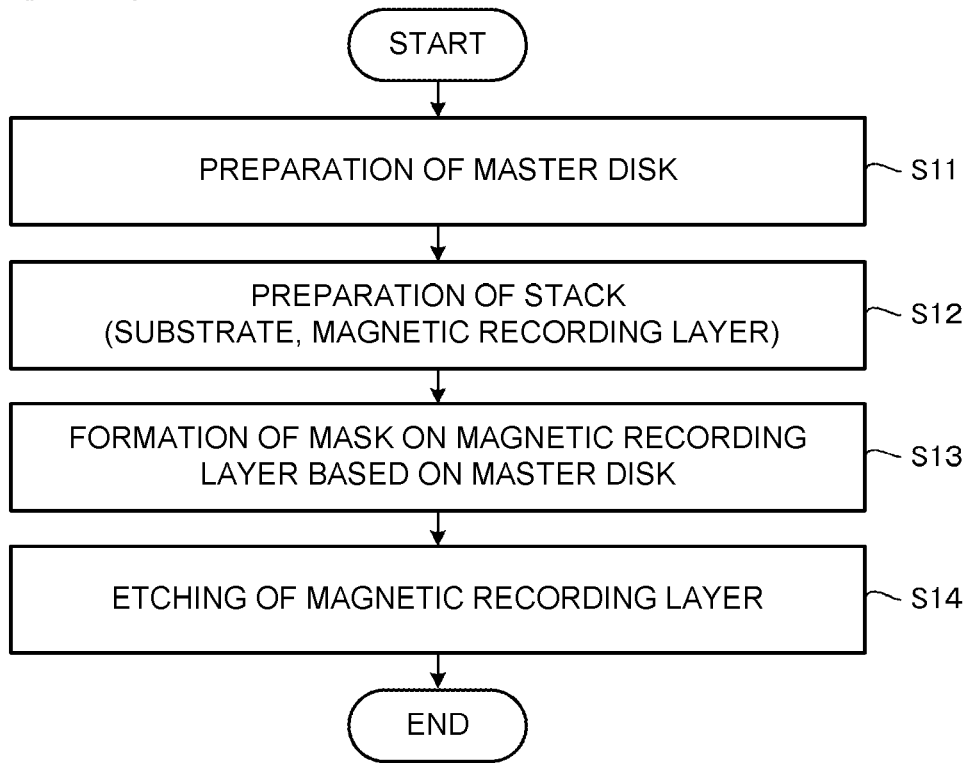
FIG. 10 is a flow chart illustrating a method of fabricating the magnetic recording medium according to the embodiment.

A method of fabricating the magnetic recording medium 10 according to the present embodiment will be described. FIG. 10 is a flow chart illustrating one example of a method of fabricating a magnetic recording medium. FIG. 11A to FIG. 11F are sectional schematic diagrams illustrating the magnetic recording medium to be fabricated through this fabrication method.

As described above, the magnetic recording medium 10 to be fabricated is as follows. Specifically, this magnetic recording medium 10 has the servo area 22 and the data area 23. The data area 23 is divided in the circumferential direction and the radial direction by the boundary magnetic parts 32. In the data area 23, the plurality of physically isolated magnetic dots 41 are arrayed approximately in the hexagonal close-packed form (the magnetic dots 41 are periodically arrayed in three directions). The boundary magnetic part 32 has the plurality of magnetic portions 42 and the plurality of magnetic dots 43. Each of the plurality of magnetic dots 43 having approximately the same size as that of the magnetic dot 41 is disposed between the plurality of magnetic portions 42. On the side adjacent to the data part 31, the magnetic dot 43 of the boundary magnetic part 32 satisfies the same phase condition of the arrangement as that of the magnetic dot 41.

Figure 11A:
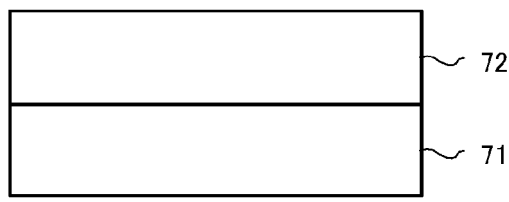
FIGS. 11A-11F are schematic diagrams illustrating the magnetic recording medium to be fabricated.
Figure 11B:
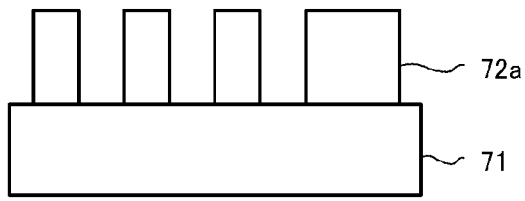
Figure 11C:
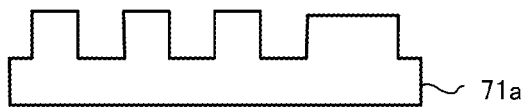

(1) Preparation of Master Disk 71*a* (Step S11, FIG. 11A to FIG. 11C)

A master disk 71*a* is prepared. For example, the master disk 71*a* is created in the following manner.

First, a resist layer 72 is coated on a substrate 71 used as a master disk for forming a mask pattern (FIG. 11A).

On the resist layer 72, a desired pattern is drawn using an electron beam, for example. The pattern also may be drawn by an optical lithography process.

The resist layer 72 is then developed, to thereby form a patterned resist layer (processed pattern) 72*a* (FIG. 11B). Note that the pattern may also be formed by physically transferring the pattern by nanoimprint lithography or the like. Then, the substrate 71 is etched by using the processed pattern (resist layer 72*a*) as a mask, to thereby obtain the master disk 71*a* with the mask pattern (FIG. 11C).

(2) Preparation of Stack (Substrate, Magnetic Recording Layer) (Step S12)

A stack in which a substrate 73 and a magnetic recording layer 74 are stacked, is prepared. The substrate 73 is made of a nonmagnetic material, and the magnetic recording layer 74 is made of a magnetic material.

Figure 11D:
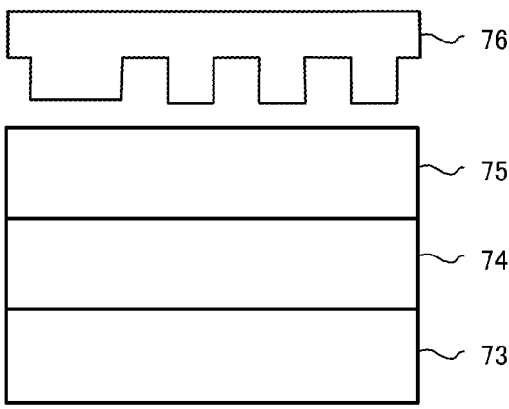
Figure 11E:
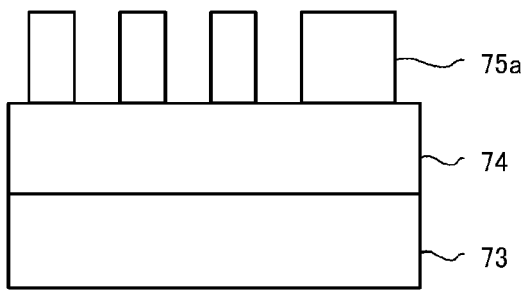

(3) Formation of mask on magnetic recording layer 74 (Step S13, FIG. 11D, FIG. 11E)

A mask (patterned resist layer 75*a*) is formed on the magnetic recording layer 74. Specifically, a mask layer made of resist (resist layer 75) is formed on the magnetic recording layer 74 of the stack. A nanoimprint mold 76 created from the master disk 71*a* is pressed against the resist layer 75 (FIG. 11D). The nanoimprint mold 76 may be the master disk 71*a* itself. Accordingly, the resist layer 75*a* having a desired pattern is formed on the magnetic recording layer 74 (FIG. 11E).

The resist layer 75*a* has areas R1 and R2 corresponding to the data part 31 and the boundary magnetic part 32, respectively, of the magnetic recording medium 10. In the area R1, projecting portions 75*b* corresponding to the magnetic dots 41 are disposed. In the area R2, projecting portions 75*c* corresponding to the magnetic portions 42 and projecting portions 75*d* corresponding to the magnetic dots 43 are disposed. Shapes, sizes and dispositions of these projecting portions 75*b* to 75*d* correspond to those of the magnetic dots 41, the magnetic portions 42, and the magnetic dots 43.

Figure 11F:
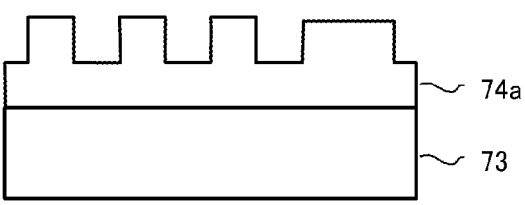

(4) Etching of Magnetic Recording Layer (Step S14, FIG. 11F)

The magnetic recording layer 74 is etched via the resist layer 75*a* (FIG. 11F). As a method of the etching, it is possible to use a method known for processing a magnetic material, such as ion milling and reactive ion etching (RIE).

Note that it is also possible to omit the process illustrated in FIG. 11A to FIG. 11D. Specifically, it is also possible to directly draw the pattern on the resist layer 75 provided on the magnetic recording layer 74 by the electron beam drawing. By developing the resultant, the resist layer 75*a* illustrated in FIG. 11E can be created without conducting the process illustrated in FIG. 11A to FIG. 11D. In this case, the process is simplified, and a mask accuracy is improved. However, a throughput may be lowered.

The process flow described above and illustrated in FIG. 11A to FIG. 11F indicates a minimum required one. It is also possible to add a generally known process for the purpose of improvement in accuracy of the process and the like. For example, the resist layer 72 or 75 can be set to have a plurality of layers. Further, it is also possible to provide an etching stop layer or the like at a lower layer of the resist layer 72 or 75, to thereby improve the processing accuracy. It is also possible to insert deposition/removal process of a protective layer into a middle of the process. It is also possible to provide a plurality of under layers, protective layers and the like on and under the magnetic recording layer 74.

(Self-Assembly)

Figure 12:
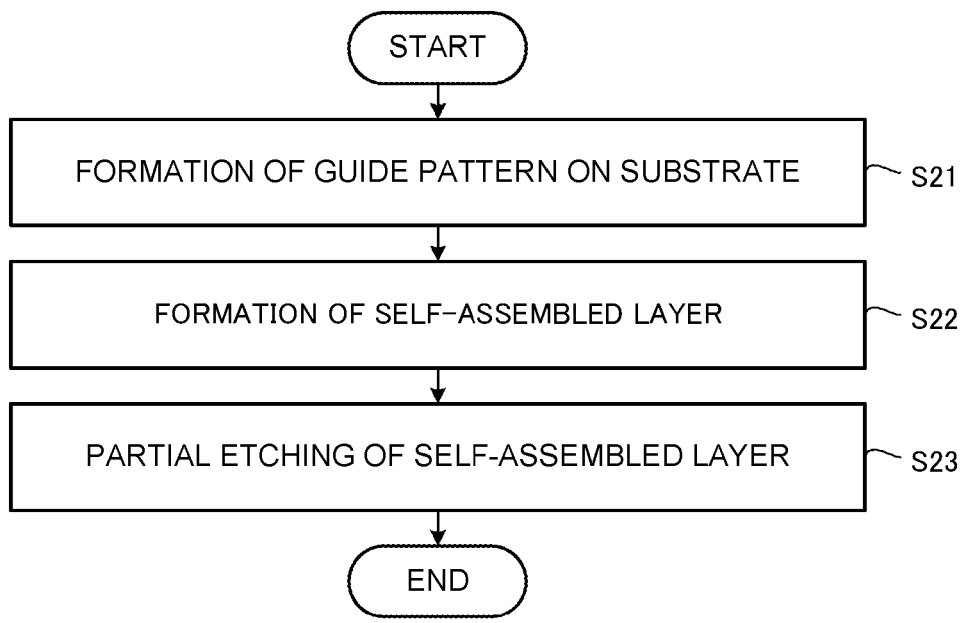
FIG. 12 is a flow chart illustrating a method of fabricating a mold of the magnetic recording medium according to the embodiment.

A method of fabricating the nanoimprint mold 76 for the magnetic recording medium according to the present embodiment will be described. FIG. 12 is a flow chart illustrating one example of a method of fabricating the nanoimprint mold 76 (mold). FIG. 13A to FIG. 13F are sectional schematic diagrams illustrating a nanoimprint mold (mold) to be fabricated through this fabrication method.

Figure 13A:
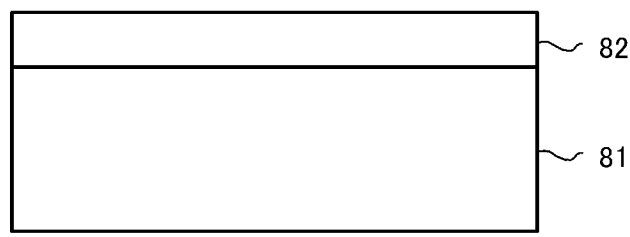
FIGS. 13A-13F are schematic diagrams illustrating the mold of the magnetic recording medium to be fabricated.
Figure 13B:
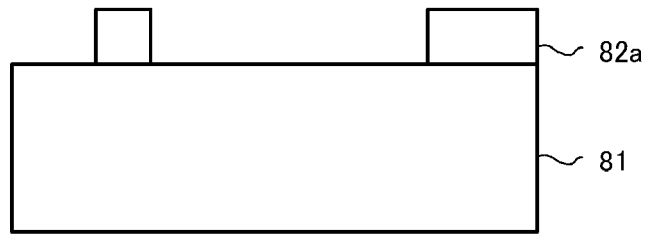
Figure 13C:
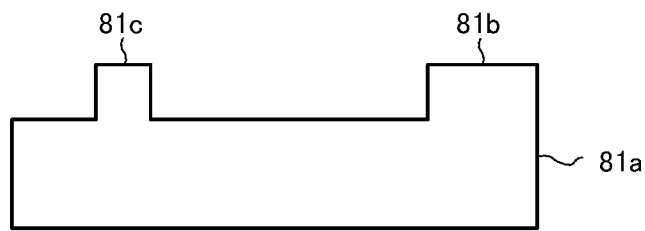

(1) Formation of Guide Pattern (Step S21, FIG. 13A to FIG. 13C)

Guide patterns 81*b* to 81*d* having a shape of the boundary magnetic part 32 are formed on a substrate 81. A photoresist is coated on a Si substrate 81, to thereby form a resist layer 82 (FIG. 13A). Thereafter, a resist guide pattern (patterned resist layer 82*a*) is formed by using a lithography technique of electron beam drawing or the like, or a technique of nanoimprint or the like (FIG. 13B).

The substrate 81 is etched via the patterned resist layer 82, to thereby create a patterned substrate 81*a* (FIG. 13C). The patterned substrate 81*a* has the guide patterns (convex portions) 81*b* to 81*d* made of Si and corresponding to the respective magnetic portions 42 and magnetic dots 43.

It is also possible that the post-guide pattern 81*d* is not provided. As will be described later, if the post-guide pattern 81*d* is provided, an accuracy of array in a self-assembly of PDMS dots 83 can be further improved.

The guide pattern 81*b* has a shape corresponding to the magnetic portion 42 illustrated in FIG. 4 to FIG. 7 (later-described side edge 811), and the PDMS dots 83 are arrayed along the side edge 811, for example. The post-guide pattern 81*c* becomes a reference of array of the later-described PDMS dots 83.

A Si film deposited on a quartz substrate may be used instead of the Si substrate. Further, it is also possible that a HSQ (hydrogen silsesquioxane) resist is coated on a substrate, and the resultant is subjected to the electron beam drawing and development. Further, it is also possible to perform the nanoimprint on the HSQ resist.

Figure 13D:
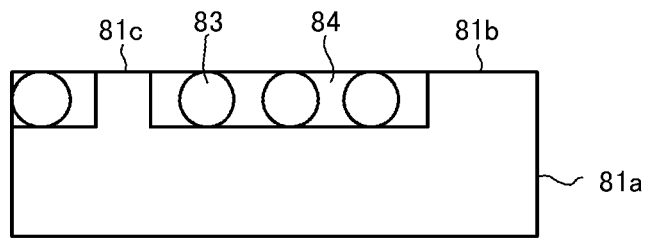

(2) Formation of Self-Assembled Layer (Composite Body of PDMS Dots 83 and PS Matrix 84, for Example) (Step S22, FIG. 13D)

A self-assembling material is coated, to thereby cause the self-assembly in accordance with the guide patterns 81b and 81c. Specifically, the self-assembling material is coated on the guide patterns 81b and 81c to cause the self-assembly (FIG. 13D).

As the self-assembling material, a diblock copolymer of polystyrene (PS)-(polydimethylsiloxane) PDMS can be used, for example.

By creating a condition where the diblock copolymer can be easily moved by heat or solvent (thermal annealing or solvent annealing), the diblock copolymer is self-assembled. Specifically, the PS-PDMS diblock copolymer is self-assembled into spherical PDMS dots 83 and the PS matrix 84 surrounding the periphery of the dots.

As a result of the self-assembly, the PDMS dots 83 are disposed in a hexagonal close-packed form. Here, the PDMS dots 83 are arrayed along the side edge 811 of the guide pattern 81b (refer to FIG. 14).

Figure 13E:
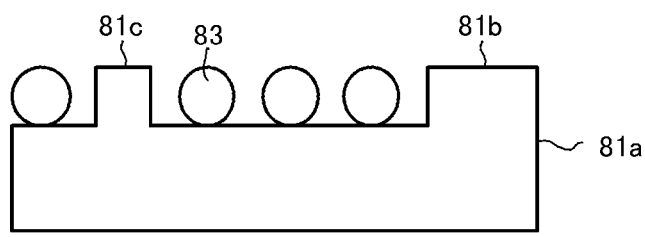
Figure 13F:
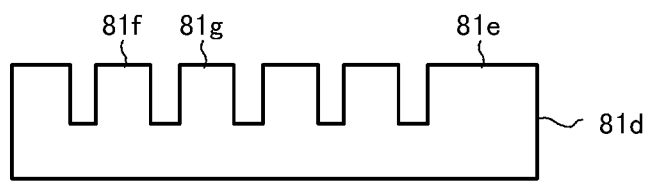

(3) Partial Etching of Self-Assembled Layer (Step S23, FIG. 13E, FIG. 13F)

The self-assembled layer is subjected to a partial etching process, to thereby form a mask pattern corresponding to the magnetic dots 41 (master disk 81e).

In the PS-PDMS diblock copolymer, Si is contained only in the PDMS block. For this reason, PS is selectively etched in RIE using oxygen, and PDMS is selectively etched in RIE using $CF_4$.

Specifically, by performing oxygen RIE on the self-assembled layer, the PS matrix 84 can be selectively etched (FIG. 13E). Thereafter, by performing etching with RIE using $CF_4$, ion milling or the like, the Si master disk 81e having a desired BPM pattern shape is obtained (FIG. 13F). This master disk 81e has guide patterns 81f, 81g, and 81h corresponding to the magnetic portions 42, the magnetic dots 43, and the magnetic dots 41, respectively.

This master disk 81e corresponds to the master disk 71a illustrated in FIG. 11C. It is also possible that this master disk 81e is replicated to obtain the nanoimprint mold 76, or this master disk 81e itself is used as the nanoimprint mold 76. The subsequent process is as illustrated in FIG. 10, and FIG. 11D to FIG. 11F.

Here, the guide patterns 81b and 81c are created by a material containing Si (Si substrate). It is also possible to create the guide patterns 81b and 81c using a carbon-based photopolymer containing no Si. In this case, a self-assembling material with which spheres of carbon-based material can be used, and to sequentially perform RIE using $CF_4$, and RIE using oxygen, in the process illustrated in FIG. 13D and FIG. 13E, and FIG. 13E and FIG. 13F.

In the guide pattern formation using the carbon-based photopolymer containing no Si, it is also possible to perform the electron beam drawing or to use the photolithography technique. Further, it is also possible to form the guide pattern by nanoimprint.

As the self-assembling material used in this case, PMMA (poly(methyl methacrylate))-PMAPOSS (poly(methyl acrylate) polyhedral oligomeric silsesquioxane) can be used, for example. In this case, a self-assembled pattern in which dots of PMMA exist in a matrix of PMAPOSS. Accordingly, the matrix is formed of POSS containing Si, the dots are formed of carbon-based PMMA, and the above-described process can be applied.

Figure 14:
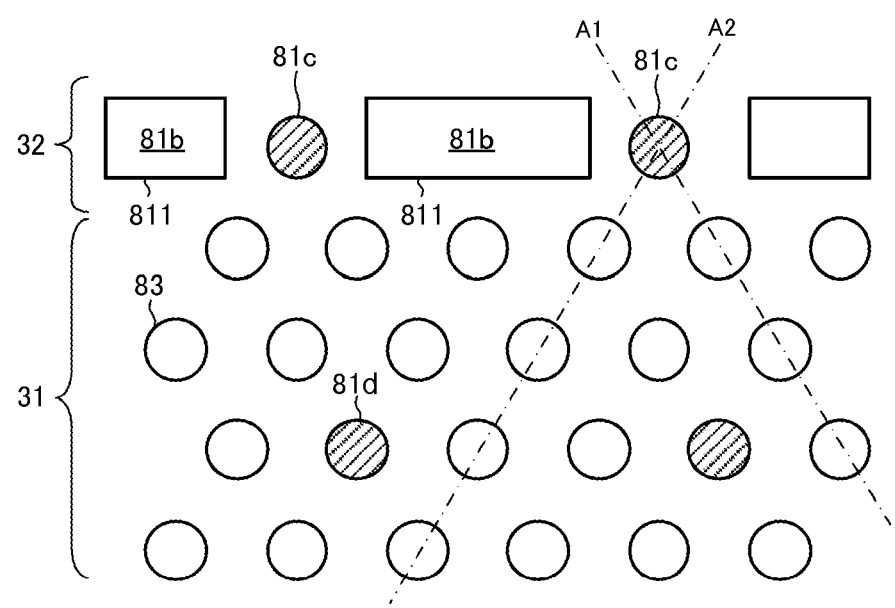
FIG. 14 is a plan view illustrating a disposition of guide patterns and a self-assembling material.

FIG. 14 illustrates a plan view explaining a disposition of the guide patterns and the self-assembling material at a stage of FIG. 13E. The guide patterns 81b and 81c made of Si are disposed at positions corresponding to those of the magnetic portions 42 and the magnetic dots 43 of the boundary magnetic part 32.

The self-assembly is caused in accordance with the guide patterns 81b and 81c, and as illustrated in FIG. 14, the PDMS dots 83 are disposed at positions corresponding to those of the magnetic dots 41 of the data part 31. At this time, the self-assembly is caused so as to be along the side edge 811 of the guide pattern 81b by setting the post-guide pattern 81c corresponding to the magnetic material dot 43 as a base point. Since the magnetic dot 43 of the boundary magnetic part 32 has approximately the same size as that of the magnetic dot 41 of the data part 31, the self-assembly is caused on the basis of the post-guide pattern 81c. As a result of this, the PDMS dot 83 has the same phase condition of the arrangement as that of the post-guide pattern 81c corresponding to the magnetic dot 43 of the boundary magnetic part 32.

Specifically, an intersection point of array directions A1 and A2 of the PDMS dots 83 corresponds to a center of the post-guide pattern 81c. Accordingly, it is possible to configure the pattern of the magnetic recording medium of the present embodiment. When the substrate 81a of Si is further etched, the master disk 81e of Si is obtained (FIG. 13F).

Instead of further etching the substrate 81a, a replica of the pattern may be obtained using a UV cured resin, and the master disk is created based on the replica. Further, it is also possible that plating of Ni is performed, and the master disk is created based on the resultant. Further, it is also possible that deposition and embedding of a metal thin film are performed by ALD (Atomic Layer Deposition), the pattern is peeled off, and the master disk is created based on the resultant.

In FIG. 14, it is also possible to provide an additional post-guide pattern 81d at a position satisfying the phase condition of the arrangement, for the purpose of further improving the accuracy of array in the self-assembly of the PDMS dots 83. The larger the number of the guide patterns 81d to be disposed, the more the accuracy of array is improved, and further, it becomes possible to change the pitch P1 along the radial direction of the magnetic recording medium 10. However, it may take time to draw many post-guide patterns.

The process illustrated in FIG. 13A to FIG. 13F, and FIG. 14 is just an example, and the method of fabricating the medium of the present embodiment is not limited to this.

In the present embodiment, it is possible to obtain a signal when the magnetic head 51 crosses the sectors 21 (zones). At the same time, it is possible to obtain information such as pitch information and phase information of the data parts 31 before and after passing the sector 21 (zone).

Example 1

An example 1 will be described. This example 1 corresponds to FIG. 4 to FIG. 7.
(1) Creation of Master Disk 71a Using Only Electron Beam Drawing A master disk 71a having a BPM pattern was created. An 8-inch silicon wafer was spin-coated with a resist (ZEP520A (ZEON CORPORATION)) with a thickness of 50 nm. This wafer was annealed (heated) at 180° C. for 3 minutes on a hot plate, and was then subjected to drawing by an electron beam drawing apparatus. The resist after recording was developed for 30 seconds using a developing solution (ZED-N50), to thereby form a pattern of resist (refer to FIG. 11A and FIG. 11B).

Each of the patterns illustrated in FIG. 4 to FIG. 7 was drawn approximately at a middle of a radius of the wafer (radius r=22 mm). A length in the radial direction of the data part 31 was set to 1 μm, and each pattern was repeatedly drawn 20 times.

In each of patterns illustrated in FIG. 5, FIG. 6, and FIG. 7, the pitch P1 of the magnetic dots 41 in each of the data parts 31*a* and 31*b* divided by the boundary magnetic part 32 was set to be constant. Further, the pitch P1 in the data part 31*b* (outer side) was set to be larger than the pitch P1 in the data part 31*a* (inner side) by 10%. In an example illustrated in FIG. 7, the pitch P3 of the magnetic dots 44 on the center portion of the boundary magnetic part 32 was set to have an average value of the pitches P1 of the magnetic dots 41 in the data parts 31*a* and 31*b* (specifically, 1.05 times the pitch P1 in the data part 31*a*).

The pitch P1 of the magnetic dots 41 in the data part 31*a* on the innermost periphery was set to 40 nm. The diameter D1 of the magnetic dot 41 in the whole area of the data part 31*a* was set to 20 nm. In the circumferential direction, one round was divided into 252 sectors 21, and in each sector 21, an address by Gray code, a preamble mark, a phase difference servo pattern were formed.

A length in the circumferential direction (direction A3) of the magnetic portion 42 of the boundary magnetic part 32 was set to 50 nm, and a distance from an end portion of the magnetic portion 42 to a center of the magnetic dot 43 was set to 40 nm. The pitch P2 of the magnetic dots 43 was set to 5 times the pitch P1 of the magnetic dots 41 of the adjacent data part 31. When drawing the pattern illustrated in FIG. 5, a deviation corresponding to 10% of the pitch P1 in the data part 31 (distance Δd) was intentionally provided on the outer peripheral side. Further, in a case of the pattern illustrated in FIG. 7, one missing of dot (area 45 having no magnetic material dot 43*a*) per five magnetic dots 43 was provided on the inner peripheral side.

A Ni film was sputter-deposited on the formed resist pattern to be formed as a conductive film, and a Ni plating layer was deposited through an electro plating method. This Ni plating layer was peeled off to produce a Ni stamper. This Ni stamper was used as the nanoimprint mold 76 (FIG. 11D).

In the present example, the process illustrated in FIG. 11C was omitted. On the contrary, it is also possible to obtain the Si master disk 71*a* by etching the Si substrate with RIE using $CF_4$ via the resist pattern, as illustrated in FIG. 11B. By designing as above, a thickness of the Ni conductive film can be reduced, resulting in that a finer pattern can be formed with high accuracy.

(2) Preparation of Stack (Substrate 73, Magnetic Recording Layer 74)

As the substrate 73, a 2.5-inch glass disk substrate was used. On this glass disk substrate, $Ni_{60}Ta_{40}$ (10 nm), Pd (4 nm), Ru (20 nm), $Co_{80}Pt_{20}$ (7 nm), and C (5 nm) were sequentially deposited, and the resultant was set as a master disk (stack) of the magnetic recording medium 10. The CoPt layer is a so-called perpendicular magnetic film (magnetic recording layer 74) exhibiting a perpendicular magnetic anisotropy.

The present embodiment is not limited to this configuration. For example, there is no problem if there are provided a soft magnetic under layer, a plurality of under layers for controlling a crystal orientation and controlling a microstructure, an exchange coupling multilayered magnetic recording layer, and the like which are used in a general perpendicular magnetic recording medium.

(3) Creation of Mask (Patterned Resist Layer 75*a*)

A positive resist (S1818) was diluted 10 times and coated on the master disk (stack) to have a film thickness of 100 nm using a spin-coat method, to thereby produce a resist layer 75. Onto the resist layer 75, a pattern of Ni mold (nanoimprint mold 76) was transferred by nano-imprinting under room temperature and high pressure (FIG. 11D). The height of the pattern was 40 nm. Next, a bottom of a groove pattern of the resist layer 75 was removed by oxygen RIE, to thereby create a patterned resist layer 75*a* (FIG. 11E). With the oxygen RIE, a C layer at the bottom of the groove pattern (protective layer of the CoPt layer (magnetic recording layer 74)) was removed to expose a part of the CoPt layer.

(4) Etching of Magnetic Recording Layer 74

The CoPt (magnetic recording layer 74) was processed through an Ar ion milling method by using the resist pattern (resist layer 75*a*) as a mask (FIG. 11F). A milling time was controlled so that the etching proceeded to the Ru under layer. Thereafter, C (protective layer) was deposited by sputtering, and an Ar ion etching was performed at a low irradiation angle to flatten a surface of the protective layer. A magnetic recording medium was created in the above-described manner.

(Evaluation)

With the use of a spin-stand evaluation apparatus, the created magnetic recording medium was reproduced and evaluated. Prior to the evaluation, a magnetic field of 20 kOe was applied to the magnetic recording medium, and all areas were magnetized in one direction.

The magnetic head 51 having a read width of 60 nm, a read gap of 35 nm, and a flying height of 4 nm, was used. The magnetic head 51 was moved little by little from an inner periphery to an outer periphery without performing tracking, and a change in signal was examined by a digital oscilloscope.

The magnetic recording medium is eccentric according to a mounting position. Accordingly, from an envelope waveform of a reproduced signal, a position (a certain rotation angle) at which the magnetic head 51 is approximately on-track was found out. Further, the digital oscilloscope was adjusted so as to lock a measurement point to the position of the angle. Under that state, the magnetic head 51 was moved little by little to the outer periphery, by diverting a track profile measurement mode. All of the data parts 31 were magnetized to one direction (all-one). The SN ratio was not so large due to the large read gap, but, it was possible to confirm a signal indicating all-one, and to confirm a peak of frequency corresponding to the signal in a spectrum analyzer.

In the measurement of pattern illustrated in FIG. 4, it was possible to distinguish a reproduced signal in the boundary magnetic part 32 from that in the data part 31 since the signal from the data part 31 was a single frequency signal. Although the signal in the data part 31 was superimposed a little on the reproduction signal in the boundary magnetic part 32 due to a large read width, the reproduced signal approximately exhibited a characteristic illustrated in FIG. 8.

A reproduced signal from the data part 31 closest to the boundary magnetic part 32 and a reproduced signal from the boundary magnetic part 32, which was similar to that shown in the lower part of FIG. 8, were taken into the digital oscilloscope. These reproduced signals were digitized and then subjected to FFT processing.

As a result of this, the period of the reproduced signal from the boundary magnetic part 32 was five times longer than that from the data part 31. The period of the signal from the boundary magnetic part 32 was converted to the period from the data part 31 (reduced to ⅕), then the phase was calculated. As a result of this, the position of the magnetic dot 43 was calculated to be deviated by a half of the pitch P1 in the data part 31. That is, the arrangement of the magnetic dots 41 and 43 were confirmed to be that illustrated in FIG. 4.

A pattern of the boundary magnetic part 32 illustrated in FIG. 5 was examined. Similar to the example illustrated in FIG. 4, it was possible to distinguish the reproduced signal from the boundary magnetic part 32 and that from the data part 31. Although the signal from the boundary magnetic part 32 included the signal from the data part 31a little bit, it was possible to identify a signal corresponding to the magnetic dot 43. With the movement of the magnetic head 51, the signal from the magnetic dot 43 changed, and signals similar to Ga and Gb in the lower part of FIG. 9 were obtained.

Information on the period and phase of the signals from the boundary magnetic part 32 was calculated by processing similarly to that in the example illustrated in FIG. 4. As a result of this, periods and phases of the magnetic dots 41 in the data parts 31a and 31b were well estimated by a similar manner to that in the example illustrated in FIG. 4. Note that an influence of deviation of magnetic dot 43b(distance Δd) was small in the signals, and no difference was observed in the estimated periods and phases of data parts 31a and 31b.

A signal from the boundary magnetic part 32 illustrated in FIG. 6 was examined. Since a distance between the magnetic portions 42 was smaller than that in the example illustrated in FIG. 5, the waveform contained large amount of the signal from the magnetic portions 42. However, waveforms similar to those shown in FIG. 9 were obtained. Information on the period and phase of each of the data parts 31a and 31b were well estimated by an analysis similar to that in the example illustrated in FIG. 5.

A signal from the boundary magnetic part 32 illustrated in FIG. 7 was examined. Similar to the example illustrated in FIG. 4, it was possible to distinguish the reproduced signal from the boundary magnetic part 32 from the reproduced signal from the data part 31. Although the reproduced signal from the boundary magnetic part 32 contained the signal from the data part 31, it was possible to identify the signal from the magnetic dot 43. As the magnetic head 51 moved, the signal from the magnetic dot 43 changed, and the signals similar to Ga and Gb in the lower part of FIG. 9 were observed.

When the magnetic head 51 passed at a center of the boundary magnetic part 32, a large signal with the intensity similar to that of the data part 31 was obtained, then information on the period and the phase were able to be estimated with small error.

Note that due to the missing of dot (area 45 having no magnetic material dot 43a) in the boundary magnetic part 32 near the data portion 31a, the FFT intensity corresponding to the period of the magnetic dot 43 was reduced. However, the information on the period and the phase were well estimated. A lack of one dot in five dots array seemed to cause not so much noise to failing the FFT analysis. However, since the error was slightly increased, this example may not be applicable to the specification of high speed and high accuracy system. Note that since there are continuous dot array at the center of the boundary magnetic part 32, it was also possible to recover the above-described error by using the information from the center dot array.

Example 2

An example 2 will be described. This example 2 corresponds to FIG. 5.
(1) Creation of Ni Stamper Using Electron Beam Drawing A master disk for the magnetic recording medium 10 was created, and a Ni stamper was replicated from this master disk. A material of the master disk 71a of the example 1 (an 8-inch silicon wafer spin-coated with a resist (ZEP520A (ZEON CORPORATION)) with a thickness of 50 nm) was used, and the material was subjected to electron beam drawing. Only the pattern for the boundary magnetic part 32 illustrated in FIG. 5 (the magnetic material portions 42, and the magnetic material dots 43a and 43b) was repeatedly drawn for 20 times approximately at a middle of the radius of the wafer (radius r=22 mm). That is, all of the patterns for the magnetic dots 41 of the data part 31 were not drawn. Thereafter, the Ni stamper was created in a process similar to that of the example 1.
(2) Creation of Guide Patterns 81b and 81c A resist (S1818) was diluted 10 times and spin-coated on a Si substrate 81 to have a film thickness of 100 nm, to thereby produce a resist layer 82 (FIG. 13A). Onto the resist layer 82, a pattern of Ni mold was transferred by nao-imprint under room temperature and high pressure, then a bottom of a groove pattern was removed by oxygen RIE (FIG. 13B).

The Si substrate 81 was etched by RIE with $CF_4$ gas by using the resist pattern (resist layer 82a) as a mask, to thereby create a substrate 81a having the guide patterns 81b and 81c (FIG. 13C).
(3) Self-Assembly A residual resist was removed by oxygen RIE, and then a self-assembling material was coated on it (FIG. 13D).

As the self-assembling material, polystyrene-polydimethylsiloxane (PS-PDMS) was used. A molecular weight of PS was 130000, and a molecular weight of PDMS was 7500. Toluene was used as a solvent. A solution of 0.5 wt % of PS-PDMS was then spin-coated on the substrate 81a.

PS-PDMS layer was then annealed in a vacuum at 180° C. for 24 hours in order to cause a phase separation of PS-PDMS. From another experiment, it has been found that the PS-PDMS forms a self-assembled pattern of PDMS dots having a pitch of 35 nm. Therefore, the self-assembled pattern of 35 nm-pitch dots was formed between the guide patterns 81b and 81c of the Si substrate 81a.
(4) Creation of Nanoimprint Mold 76

After the PS matrix was removed using oxygen RIE (FIG. 13E), the Si substrate was etched by RIE using $CF_4$ gas (FIG. 13F). An etching depth of the Si substrate was adjusted to be 50 nm through time control.

From this Si master disk 81e, a Ni stamper (nanoimprint mold 76) was created by a method similar to that of the example 1, and subsequently, a method similar to that of the example 1 was used to create a magnetic recording medium.
(5) Evaluation The pattern on the Si master disk 81e was observed by a scanning electron microscope. It was confirmed to have a shape similar to that illustrated in FIG. 5. However, an ordering deviation of about 5% was observed in the dots array at a center of the data parts 31a and 31b.

The created magnetic recording medium was evaluated by the spin-stand apparatus by a similar manner to the example 1. Information on the period and phase of each of the data parts 31a and 31b adjacent to the boundary magnetic part 32 was successfully estimated, similar to the example 1.

The ordering deviation at the center of the data parts 31a and 31b can be corrected, for example, in a manner of the following (1) to (3). (1) to use an advanced error correction technique, (2) to skip the error area as error data, and (3) to increase the frequency of using the boundary magnetic part 32 (a width in the radial direction of the data part 31 is reduced). However, for a BPM with high density and high accuracy, it is preferable to cause the self-assembly with higher accuracy.

Example 3

An example 3 will be described. This example 3 utilizes a self-assembly with a solvent vapor annealing process, and corresponds to FIG. 4 to FIG. 7.

A master disk of the magnetic recording medium 10 was created in a method similar to that of the example 2. $Ni_{60}Ta_{40}$ (25 nm), Cr (50 nm), Pt (10 nm), $Fe_{50}Pt_{50}$ (3.2 nm), and C (5 nm) were sequentially stacked on a 2.5-inch glass disk substrate, and the resultant was set as a master disk (stack) of the magnetic recording medium 10.

After the formation of NiTa layer, small amount of oxygen was exposed. Heating was conducted at about 250° C. at the time of the deposition of FePt layer. The FePt layer exhibits a perpendicular magnetic anisotropy, and also exhibits magnetic properties of L10 ordered phase.

The subsequent fabrication process was similar to that of the example 2. However, in addition to the boundary magnetic part 32, post-guide patterns 81d were placed in the data part 31 as illustrated in FIG. 14. The post-guide patterns 81d were placed at the position where magnetic dots 41 should be placed, and the density of the post-guide 81d was one per five in the vertical and lateral directions of the array.

In each of the patterns illustrated in FIG. 5 to FIG. 7, the position of the post-guide pattern 81d was determined in the following manner. The pitch P1 of the magnetic dots 41 was set to be constant inside of each of the data parts 31a and 31b, and the pitch P1 in the data part 31a and that in the data part 31b were set to differ by 3%. That is, the data part 31a with natural pitch of PS-PDMS and the data part 31b with a pitch enlarged by 3%, appeared alternately along the radial direction. Further, in the example illustrated in FIG. 7, the pitch P3 of the magnetic dots 44 of the boundary magnetic part 32 was set to the same pitch as the pitch P1 in the data part 31a.

Solvent vapor annealing process was applied for self-assembly, instead of the annealing by heating. The Si substrate 81a coated with PS-PDMS was put into a sealed chamber, and mixed saturated gas of toluene and nitrogen was flowed into the chamber for 3 hours under atmospheric pressure. The mixed saturated gas was obtained by bubbling nitrogen gas in toluene.

The pattern on the Si master disk 81e was observed by the scanning electron microscope, similar to the case of the example 2, and it was confirmed to have a shape similar to that in FIG. 4 to FIG. 7. Although a disorder of array of dots in the data part 31 was observed, it was not localized in the data part 31 and was about 0.5% on the average.

A similar result was obtained when the created magnetic recording medium was evaluated in a manner similar to that of the example 1. In the case of the pattern illustrated in FIG. 4, information of the period and phase of the data part 31 were successfully estimated. In the case of the pattern illustrated in FIG. 5, information on the periods and phases of the both data parts 31a and 31b were confirmed to be successfully estimated. In the case of the pattern illustrated in FIG. 6, an approximately the same result as the result of the pattern illustrated in FIG. 5 was obtained.

In the case of the pattern illustrated in FIG. 7, an error component in a reproduced signal from the magnetic dot 43 was increased due to the missing of dot (area 45 having no magnetic dot 43a), but a period and a phase were successfully estimated from the reproduced signal. Further, information on the period and the phase of the data part 31a were confirmed to be able to be corrected by using reproduced signals from the magnetic dots 44 at the center portion of the boundary magnetic part 32. Similar to the example 1, an influence of deviation (distance Δd) of pattern illustrated in FIG. 5 was small.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A method of fabricating a magnetic recording medium, comprising:
    preparing a stack including a substrate and a magnetic recording layer disposed on the substrate;
    forming a mask having a first area including a plurality of first projecting portions arrayed in lines in mutually different first, second, and third directions, and a second area including a plurality of second projecting portions arrayed in a line in the third direction and each having a length longer than that of the respective first projecting portions in the third direction, and a plurality of third projecting portions each disposed between adjacent second projecting portions and on extensions in the first and the second directions of the first projecting portions, and disposed along with the first area, on the magnetic recording layer; and
    forming a plurality of first magnetic dots corresponding to the first projecting portions, a plurality of magnetic portions corresponding to the second projecting portions, and a plurality of second magnetic dots corresponding to the third projecting portions, by performing etching on the magnetic recording layer by using the mask.

2. The method of fabricating the magnetic recording medium according to claim 1,
    wherein each of the first projecting portions and the third projecting portions have approximately the same shape and approximately the same size.

3. The method of fabricating the magnetic recording medium according to claim 1,
    wherein the first projecting portions are arrayed approximately in a hexagonal close-packed form.

4. The method of fabricating the magnetic recording medium according to claim 1,
    wherein the substrate is made of a nonmagnetic material.

5. The method of fabricating the magnetic recording medium according to claim 1,
    wherein the lengths of the second projecting portions in the third direction is 1.5 to 10 times longer than those of the first projecting portions.

6. The method of fabricating the magnetic recording medium according to claim 1,
    wherein the mask further includes a third area, disposed along with the first area via the second projecting portions, and including a plurality of fourth projecting portions arrayed in lines in the first, the second, and the third directions,
    wherein the second area further includes a plurality of fifth projecting portions each disposed on extensions in the first and the second directions of the fourth projecting portions.

7. The method of fabricating the magnetic recording medium according to claim 6,
    wherein the third and the fifth projecting portions are disposed along the first or the second direction.

8. The method of fabricating the magnetic recording medium according to claim 6,
    wherein the second area comprises:
    a plurality of sixth projecting portions arrayed in a line in the third direction; and a plurality of seventh projecting portions disposed between the second projecting portions and the sixth projecting portions.

9. The method of fabricating the magnetic recording medium according to claim 1, further comprising:
   forming a plurality of first guide patterns corresponding to the second projecting portions, and a second guide pattern corresponding to a third projecting portion, on a second substrate;
   coating a self-assembling material on the second substrate on which the first and the second guide patterns are formed;
   forming a plurality of dot patterns corresponding to the first projecting portions by causing a self-assembly of the coated self-assembling material; and
   forming the mask by using the substrate on which the dot patterns are formed.

10. The method of fabricating the magnetic recording medium according to claim 9,
   wherein the formation of the first and the second guide patterns comprises forming a third guide pattern corresponding to any one of the first projecting portions.

\* \* \* \* \*